Feb. 29, 1944. A. D. DIRCKSEN 2,342,651
ILLUMINATED TOW TARGET
Filed May 22, 1942 2 Sheets-Sheet 1

INVENTOR
ARNOLD D. DIRCKSEN

Feb. 29, 1944. A. D. DIRCKSEN 2,342,651
ILLUMINATED TOW TARGET
Filed May 22, 1942 2 Sheets-Sheet 2
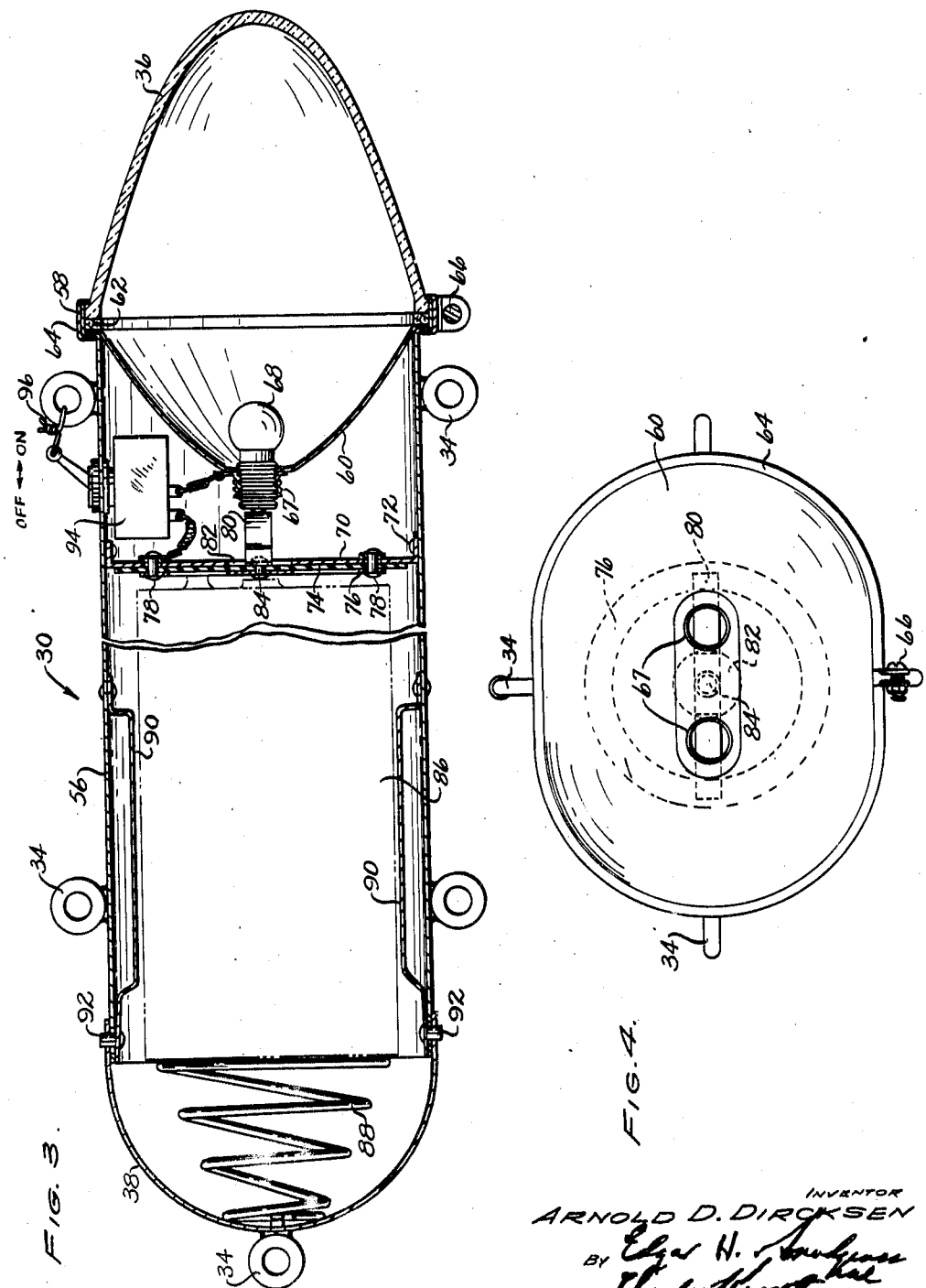
INVENTOR
ARNOLD D. DIRCKSEN
BY
ATTORNEYS Patented Feb. 29, 1944

2,342,651

UNITED STATES PATENT OFFICE 2,342,651

ILLUMINATED TOW TARGET

Arnold D. Dircksen, Dayton, Ohio

Application May 22, 1942, Serial No. 444,060

3 Claims. (Cl. 240—6.4)

(Granted under the act of March 3, 1883, as amended April 30, 1928; 370 O. G. 757)

The invention described herein may be manufactured and used by or for Government for governmental purposes, without the payment to me of any royalty thereon.

This invention relates to tow targets and more particularly to illuminated tow targets which may be used for night gunnery practice, either by the gunners of pursuing aircraft or by the operators of anti-aircraft guns located on the ground.

Various systems have been used in the past for illuminating targets towed behind aircraft, one such system being to illuminate the target by means of a spotlight located either on the ground or on the towing aircraft. This system has the disadvantage, however, of requiring the use of a very large and expensive spotlight in order to satisfactorily illuminate a target which is towed at a considerable distance from the source of light. If the spotlight is located on the ground, considerable difficulty is experienced in locating and suitably illuminating a target which is towed by an aircraft at high altitudes. In the event that the spotlight is carried by the towing aircraft, a very large and heavy spotlight must be carried by the aircraft since these targets are often towed at a distance of a mile or more behind the towing craft.

In another system for illuminating aerial tow targets, electric lamps are provided within the target, the current for lighting these lamps being supplied from the towing aircraft through an electric cable which is built into the towing cable. This system has not proved satisfactory for several reasons, one being the large IR drop which occurs in the long electric cable supplying the lamps with current. Another reason contributing to the unpopularity of this system is due to the fact that it is customary to send one target after another down the towing cable to the towing hook, the target on the hook being released from the tow line each time a new one arrives at the hook. This enables successive targets to be towed by the aircraft without requiring the tow line to be reeled in each time that a new target is to be placed on the hook, the released targets being recovered by a ground crew upon completion of the target practice. This system of successively presenting new targets at the end of the towing cable renders it difficult to provide for an electrical connection between the current supply cable and the targets arriving at the towing hook.

In order to overcome these difficulties, I have devised a light and inexpensive battery operated lamp which is carried by the tow target itself and which illuminates the sleeve thereof with a directed beam of high intensity light.

Accordingly, the principal object of my invention is to provide a simple and inexpensive light source for illuminating a tow target.

Another object of my invention is to provide for the illumination of a tow target by means of a self-contained light source housed in a streamlined case. It has been found, through experiment, that a lamp case with square cut ends seriously disturbs the aerodynamic stability of a tow target. This difficulty has been overcome in the present instance by streamlining the ends of the lamp case so that the laminar flow of air through and past the target sleeves is not interfered with and consequently the presence of the lamp on the target has no adverse effects on its stability.

A further object of my invention is to provide a tow target with a high-intensity, battery-operated lamp which is adapted to be mounted at the forward end of the target for the purpose of illuminating it.

Still a further object of my invention is to provide a sleeve type of tow target with a self-contained light source capable of emitting a directed beam of light, the light source being located at the forward end of the target and having its light beam directed through the interior of the sleeve so as to illuminate it from the inside.

A preferred embodiment of the invention will be hereinafter described with reference to the accompanying drawings, given merely by way of example, in which:

Figure 3 is a cross-sectional view of the improved form of lamp which I have devised for illuminating tow targets in the manner set forth in this specification.

Figure 4 is an end view of the lamp shown in Figure 3 with the incandescent lamps removed.

Figure 1:
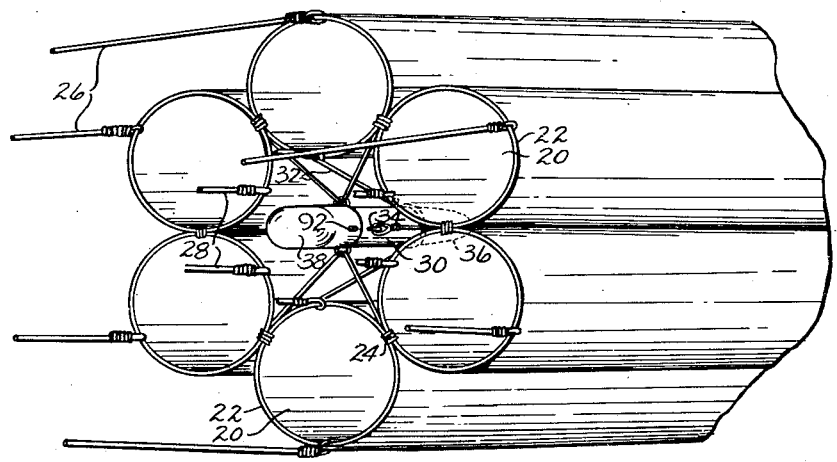
Figure 1 is a perspective view of a multiple-sleeve type of tow target having a battery operated light source located in the front end of the target.
Figure 2:
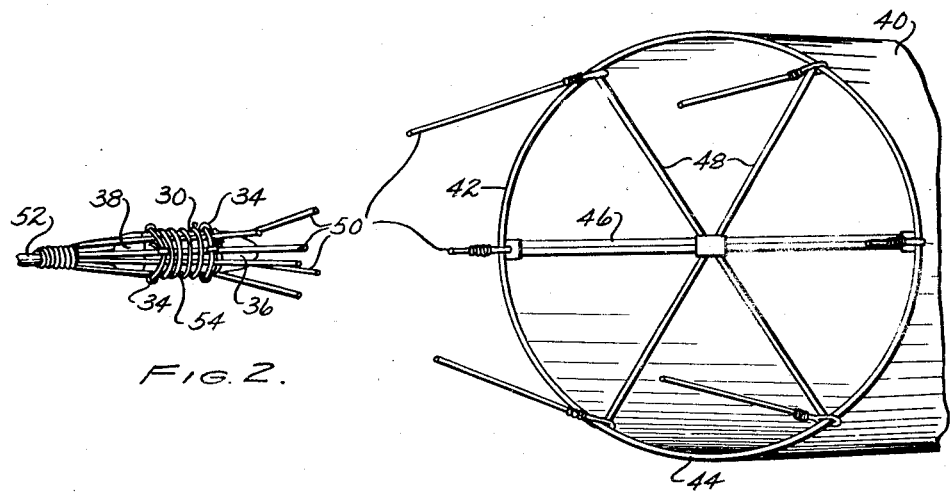
Figure 2 is a perspective view of a single-sleeve type of tow target in which the light source is mounted at the apex of the towing bridle ahead of the tow target.

At the present time there are two types of tow targets being used for the purpose of aerial and anti-aircraft gunnery practice. One type of target utilizes a plurality of small tubular sleeves of light-weight cloth, the sleeves being tied together in a cluster as shown in Figure 1. In the example shown, six such sleeves 20 are arranged with their longitudinal axes parallelly disposed, each of the sleeves being provided with a metallic mouth ring 22. These rings are tied together at their points of contact by means of a lashing cord 24. The fabric sleeves may be of any suitable length, it being customary to make these sleeves in the neighborhood of 15 or 20 feet long. The sleeves are towed at the end of the towing cable (not shown) by means of a towing bridle consisting of six ropes 26 tied to the outer portion of each of the mouth rings 22, and six additional ropes 28 tied to the inner portion of each of the rings 22. These ropes are brought together some distance ahead of the tow target into a ring which is attached to the end of the cable (not shown). A battery-operated electric lamp 30 is suspended in the center of the six sleeves by means of suspension cords 32 which extend from the lashings 24 to the anchor rings 34 provided on the case of the lamp. The lamp is positioned with its streamlined lens 36 directed toward the rear of the target and with its streamlined case cap 38 directed toward the forward end thereof. Thus, the lamp will project a directed beam of light through the interior of the target so as to illuminate the light colored fabric of the sleeves and thereby render the target readily visible in the dark.

A second type of tow target which is extensively used at the present time consists of a single fabric sleeve 40 of relatively large diameter and considerable length. This target is provided with a collapsible mouth ring comprised of two semi-circular sections 42 and 44 which are hinged together along the diametric element 46. By virtue of this construction, the mouth ring may be folded in half thereby considerably reducing the size of the target when folded. The mouth ring is reinforced by stiffening bars 48 which extend from the center of the diametric element 46 to spaced points along the circumference of the ring. The tow target is attached to the rear end of the tow cable (not shown) by means of a bridle which, in the present embodiment, consists of six ropes 50 tied at equally spaced points around the mouth ring and converging into a ring 52 attached to the end of the tow cable. The illuminating lamp 30 is secured in the apex of the towing bridle immediately to the rear of the ring 52 by means of a lashing cord 54 which is passed a number of times around the bridle ropes 50 and then through the rings 34 on the lamp casing. In this manner the lamp is securely held in place in the bridle with its lens 36 directed rearwardly toward the target and with its case cap 38 directed forwardly toward the towing aircraft. As a result of this arrangement, the lamp 30 will project a concentrated beam of light rearwardly through the interior of the sleeve 40 and thus cause the light colored fabric of the sleeve to be brightly illuminated.

Coming now to the details of the lamp itself (see Figure 3), the lamp 30 consists of a sheet metal case 56 which is bent into the form of an elliptical cylinder. Eight anchor rings 34 are brazed to the outer surface of case for the purpose of enabling the lamp to be suitably attached to the tow target. A flange 58 is rolled on the right-hand end of case, this flange serving as a seat for the flanged periphery of a parabolic reflector 60 and as a seat for the flanged base of the plastic lens 36. The lens may be made out of any suitable transparent plastic capable of being molded into the streamlined shape shown in the drawings. The plastic material known to the trade as Plexiglass has been found very satisfactory for this purpose. An annular gasket 62 constructed of cork or other suitable material, is interposed between the reflector and the lens so as to form a tight seal between them and thus prevent dirt or moisture from dulling the silvered surface of the reflector. A channel shaped clamping ring 64 engages with the flanged base of the lens 36 and with the flange 58 for the purpose of holding the lens and reflector securely on the end of the case 56. A suitable clamping bolt 66 is provided for drawing together the ends of the clamping ring so as to clamp the parts tightly in place. Two lamp sockets 67 are mounted in the bottom of the reflector 60 for the purpose of accommodating two small incandescent lamps 68 therein. Approximately one-third of the distance from the right-hand end of the case 56 is located a metallic bulkhead 70 which is secured to member 56 by means of rivets 72. A circular insulating disk 74 and a metallic contact ring 76 are attached to the left-hand face of the bulkhead 70 by means of rivets 78. The rivets 78 are suitably insulated from the metallic bulkhead 70 by means of small insulating washers placed beneath the rivet heads on the right-hand face of the bulkhead. A double-leaf contact spring 80 is located in an aperture 82 cut in the bulkhead, this spring being secured to the insulating disk 74 by means of a single rivet 84. A lantern-type battery 86 is carried in the left-hand end of the case 56, the contacts on the right-hand end of the battery being forced against the rivet 84 and the ring 76 by means of a helical spring 88 mounted in the case cap 38. The battery is held in position within the case 56 by means of U-shaped leaf springs 90 which are secured to the case at their right-hand ends by means of rivets and which, on their left-hand ends, are provided with pins 92 which yieldingly project through suitable holes provided in the case 56 and in the case cap 38. The pins 92 thus serve as a retaining means for holding the cap in place on the end of the lamp case. The contact ring 76 is electrically connected with the two sockets 67 through a toggle switch 94. The operating arm of the toggle switch is provided with a small hole so as to enable it to be tied in its "on" position by means of a wire 96 passing through the adjacent mounting ring 34. This is to insure that the lamp will remain lighted throughout the target practice.

In order that a light of high intensity may be emitted by the lamp, it has been found desirable to operate the incandescent lamps 68 in parallel and at an over-voltage. For example, suitable results have been obtained by using a six-volt battery to operate two four-volt .30 ampere lamps connected in parallel. While the life of the battery is somewhat shortened by this procedure, it has been found that the lamp will emit a high intensity beam of light for a period of from two to four hours, which is of sufficient duration for the purpose intended. By using two lamps 68, a higher intensity light is produced than could be obtained with a single lamp, and also continuous lighting of the lamp is insured even though one of the lamps 68 should burn out during the practice run.

In view of the above it will be seen that I have devised a new and useful system for illuminating tow targets. The construction shown in the drawings represents, of course, only one of the many ways in which my invention may be practised and I do not therefore, wish to be limited by the details of the structure disclosed but intend that the scope of my invention shall rather be determined by the claims which follow.

What I claim as new and desire to secure by Letters Patent is:

1. An illuminated aerial-gunnery practice device comprising an aerial target including one or more tubular sleeves of translucent material adapted to be towed by an aircraft, a lamp housing, a light source within said housing capable of emitting an intense and directed beam of light, and means for mounting said housing adjacent to the forward end of said target with the beam of light directed down the length of said sleeves so as to illuminate the latter and thereby render said target visible at night, said last-mentioned means including a plurality of anchoring eyes integral with said housing and one or more lashing cords passed through said eyes and fastened to said target for securing said housing thereto.

2. A night gunnery practice device comprising an aerial target adapted to be towed by an aircraft, said target including one or more tubular sleeves of translucent material and a towing bridle comprised of a plurality of tension members, a light source for emitting an intense and directed beam of light, said light source including a battery, a battery-operated lamp, and an elongated streamlined casing for housing said battery and said lamp, and means for mounting said casing in the forward part of said bridle with the beam of light directed through the interior of said sleeves so as to illuminate the latter from the inside and thereby render said target visible at night, said last-mentioned means including a plurality of anchoring eyes secured to said casing and a lashing cord passed over all of said tension members and through each of said eyes so as to securely bind said casing in place in the forward part of said bridle.

3. A night gunnery practice device comprising an aerial target adapted to be towed by an aircraft, said target including a plurality of translucent, tubular sleeves arranged in a cluster about a common central axis, each of said sleeves having a reinforcing ring mounted in the forward end thereof, a light source for emitting an intense and directed beam of light, said light source including a battery, a battery-operated lamp, and an elongated, streamlined casing for housing said battery and said lamp, and means for supporting said casing in the forward part of said target with the beam of light directed along the central axis of said target so as to illuminate said sleeves from the inside and thereby render the target visible at night, said last-mentioned means including a plurality of anchoring eyes secured to said casing and circumferentially disposed thereabout, and a plurality of supporting straps extending between said eyes and said reinforcing rings for securely suspending said casing in position on the central axis of said target.

ARNOLD D. DIRCKSEN.